[11] 3,633,988

[72] Inventor Reed A. Farrar
Southfield, Mich.
[21] Appl. No. 53,724
[22] Filed July 10, 1970
[45] Patented Jan. 11, 1972
[73] Assignee The United States of America as represented by the Secretary of the Navy

[54] HELMET-MOUNTED HOLOGRAPHIC AIMING SIGHT
5 Claims, 2 Drawing Figs.
[52] U.S. Cl. ...................................... 350/3.5, 356/247, 33/46 G
[51] Int. Cl. ...................................................... G02b 27/34
[50] Field of Search ........................................... 350/3.5, 10, 72, 174, 248, 298; 356/153, 142, 247, 251, 252; 33/46 G, 50 A, 48, 64 B; 2/6

[56] References Cited
UNITED STATES PATENTS
| | | | |
|---|---|---|---|
| 3,107,270 | 10/1963 | Hildebrand.................. | 350/10 |
| 3,170,979 | 2/1965 | Baldwin et al. ............... | 350/298 |
| 3,264,002 | 8/1966 | Palumbo ...................... | 33/46 G |
| 3,436,151 | 4/1969 | Conrose ...................... | 33/46 G |

FOREIGN PATENTS
| | | | |
|---|---|---|---|
| 1,532,389 | 6/1968 | France ......................... | 350/3.5 |

Primary Examiner—David Schonberg
Assistant Examiner—Ronald J. Stern
Attorneys—R. S. Sciascia and Roy Miller ABSTRACT: A head-coupled sighting reticle having a hologram incorporated in a helmet faceplate illuminated by a point source of light. The hologram is constructed by creating a spherical-plane wave-interference pattern. In operation, the pilot looks through the hologram, and superimposes the virtual image of a point source, or other configuration, on the target. The pilot's head position then indicates the direction to the target.

3,633,988

INVENTOR.
REED A. FARRAR
BY
ROY MILLER
ATTORNEY.

HELMET-MOUNTED HOLOGRAPHIC AIMING SIGHT

GOVERNMENT INTEREST

The invention described herein may be manufactured and used by or for the Government of the United States of America for governmental purposes without the payment of any royalties thereon or therefor.

BACKGROUND OF THE INVENTION

The preferred embodiment of the invention relates to the field of weaponry sighting. Previous head-coupled weapon-sighting devices used by aircraft pilots have been lens systems attached to the pilot's helmet. These devices are heavy, bulky, and clumsy. Although they can be used by helicopter pilots, the weight of the prior devices creates an unbearable strain on the pilot of a high-speed machine when his aircraft is under a heavy "G-load" configuration.

SUMMARY OF THE INVENTION

The present invention is small, lightweight and easy to operate. An off-axis, Fresnel lens hologram, constructed by creating a spherical-plane wave-interference pattern, is mounted on the faceplate of a pilot's helmet and illuminated by a spherical wave source, such as from a laser. When the pilot looks through the hologram, a virtual image of a point source, or other configuration, is reconstructed at infinity. By superimposing that point on an object, the pilot indicates the direction to the object.

DESCRIPTION OF THE PREFERRED EMBODIMENT

Figure 1:
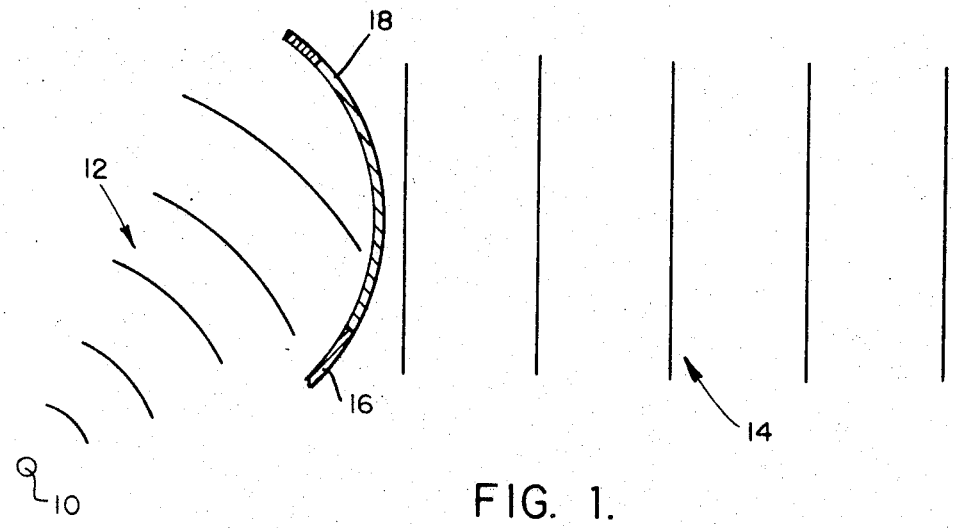
FIG. 1 is a schematic diagram of the creation of the hologram.

Referring to FIG. 1, wherein the method for creating the hologram is follows: Point laser light source 10 provides spherical waveform 12 directly and provides plane waveform 14 indirectly by reflection (not shown), to hologram-recording material 18. Hologram-recording material 18, preferably capable of being rendered transparent, is exposed to the interference pattern between waveforms 12 and 14. After hologram 18 is developed, faceplate 16 (including hologram 18) is attached to a pilot's helmet. Hologram 18 may be of any suitable hologram-recording material such as photographic emulsion, dichromated gelatin emulsion, or photopolymeric emulsion; and may be attached to or included in faceplate 16, or placed in any suitable position in the pilot's line of sight.

Figure 2:
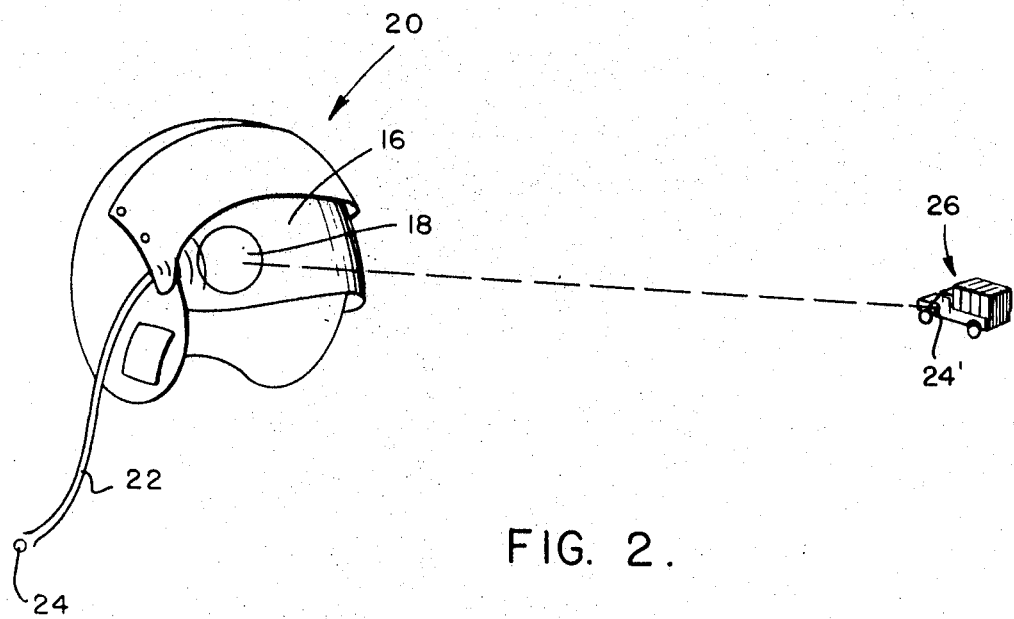
FIG. 2 is a diagrammatic view of the preferred embodiment of the invention.

Referring to FIG. 2, the preferred embodiment of the invention comprises hologram 18 positioned in a covering relationship to the pilot's right or left eye as preferred, faceplate 16, helmet 20, and fiber optic 22 extending from point source 24, or other configuration, for illuminating hologram 18 with spherical waves. The means for illuminating the hologram may be any number of point sources and fiber optics in any suitable arrangement to present the desired or required image to the operator for any intended application. Additionally is virtual image 24' of a point source, and target or object 26. Image 24' is the virtual image of the apparent point source of plane wave 14, i.e., the point which appears to be the source of wave 14.

The operation of the apparatus is as follows: Hologram 18 is illuminated by spherical waves from point source 24 via fiber optic 22. A pilot, detecting target or object 26, superimposes the virtual image 24' which he sees of a point source by looking through hologram 18, on target or object 26.

When coupled with any of the available devices capable of determining the position of a pilot's helmet within a cockpit and its orientation with respect to a reference line, the present invention precisely designates the direction to a remote target or object.

What is claimed is:

1. A sight for indicating the direction to a target, comprising:
    a helmet to be worn by an aircraft pilot;
    an at least semitransparent visor mounted on said helmet, including an at least semitransparent, spherical-plane wave-interference pattern hologram positioned in covering relationship to one of said pilot's eyes when said pilot is wearing said helmet;
    means for illuminating said hologram such that a virtual image of at least one point source is seen by said pilot wearing said helmet when he views said target, including an illuminating, spherical wave source and at least one fiber optic for transmitting the illumination of said source to said hologram;
    whereby the direction to said target is indicated by superimposing said virtual image on said target.

2. The sight of claim 1 wherein said hologram is constructed in hologram-recording material integral to said visor.

3. The sight of claim 1 wherein said hologram attached to said visor.

4. The sight of claim 1 wherein said spherical wave source is a laser.

5. The sight of claim 1 wherein the hologram-recording material of said hologram comprises dichromated gelatin.

* * * * *